United States Patent [19]

Katayama et al.

[11] Patent Number: 4,844,753

[45] Date of Patent: Jul. 4, 1989

[54] METHOD FOR FORMING INSULATING FILMS ON ELECTROMAGNETIC STEEL PLATES

[75] Inventors: Kiichiro Katayama; Kenichi Masuhara; Yasuharu Maeda; Koji Wakabayashi, all of Ichikawa, Japan

[73] Assignee: Nisshin Steel Co. Ltd., Tokyo, Japan

[21] Appl. No.: 183,755

[22] PCT Filed: Jul. 23, 1987

[86] PCT No.: PCT/JP87/00538

§ 371 Date: Mar. 25, 1988

§ 102(e) Date: Mar. 25, 1988

[87] PCT Pub. No.: WO88/00986

PCT Pub. Date: Feb. 11, 1988

[30] Foreign Application Priority Data

Jul. 25, 1986 [JP] Japan .................................. 61-173917

[51] Int. Cl.$^4$ ............................................. C23C 22/28
[52] U.S. Cl. ..................................... 148/251; 148/113; 148/264; 524/407
[58] Field of Search ................... 148/113, 6.2; 524/407

[56] References Cited

U.S. PATENT DOCUMENTS 4,032,675  6/1977  Irie ....................................... 148/6.2
4,705,821 11/1987  Ito ........................................ 148/6.2

Primary Examiner—Sam Silverberg
Attorney, Agent, or Firm—Fleit, Jacobson, Cohn & Price

[57] ABSTRACT

The present invention relates to a method for forming insulating films on electromagnetic steel plates.

Conventional films obtained by coating only an inorganic component such as a chromate, forming an organic-component film on an inorganic-component film or coating a mixture of both components individually have had disadvantages such as the occurrence of crateriform pinholes, reductions in punching properties, rises in the cost and decreases in interlayer resistance and the like.

The present invention provides a method wherein a composition obtained by combining an acrylic resin and/or an acryl-styrene resin and guanamine resin as the organic components with an inorganic substance composed mainly of a chromate is coated and dried on an electromagnetic steel plate to form thereon an insulating film.

According to the present invention, it is possible to form an insulating film which has excellent film properties and is free from said disadvantages.

1 Claim, 1 Drawing Sheet

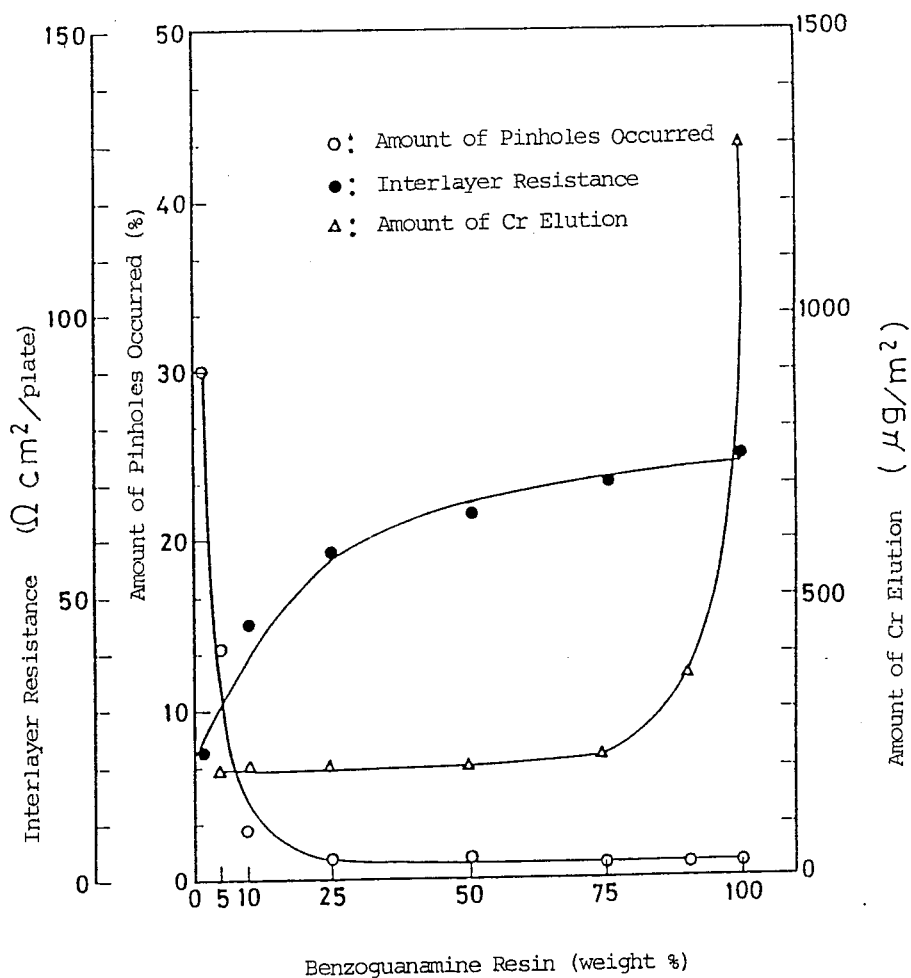

METHOD FOR FORMING INSULATING FILMS ON ELECTROMAGNETIC STEEL PLATES

TECHNICAL FIELD

The present invention relates to a method for forming an insulating film on electromagnetic steel plates used with the motors and transformers for electric apparatus, excelled in insulating, punching, welding properties, space factor and other film properties by preventing the formation of film defects such as crateriform pinholes and foams from occurring therein to be caused when forming such insulating films thereon.

BACKGROUND TECHNIQUE

Theretofore, a number of techniques have been proposed for the method for forming insulating films on the surfaces of electromagnetic steel plates or the compositions for forming insulating films (which may hereinafter be referred to as the insulating film compositions). In the main part of these techniques, use is made of the insulating film (which may hereinafter be simply called the film) compositions containing as the principal component a chromate and a phosphate or a combination thereof to form inorganic films. The film properties have been improved by the following various procedures, viz., the addition of metal oxides such as MgO, ZnO and CaO which react with free acids present in the film compositions to enhance the insulating properties of the films, the addition of small amounts of glycerin and saccharides for promoting the aforesaid reactions and forming oxides insoluble in water and organic solvents, and further the addition of boric acid, waterglass, condensed phosphates, silica and the like. (Aqueous solutions of inorganic film-forming substances containing a chromate or a phosphate as mentioned above may hereinafter be called the inorganic film compositions.) However, the inorganic films occupied by and composed of for the most part such inorganics have been disadvantageous in that they excel in insulating properties, but are yet inferior in punching properties, adhesion at the time of processing and the like.

In recent years, weight has been given to the punching properties of electromagnetic steel plates. To improve the punching properties, there have been attempted the method for forming organic films on the above inorganic films, the method for forming mixed inorganic/organic films by the application of the film compositions containing admixtures of inorganic film-forming elements such as chromates or phosphates (which may hereinafter be referred to as the inorganic components) and organic film-forming resin (which may hereinafter be called the organic component or simply the resin), and the like.

However, the former method involves two coating steps, and unavoidably gives rise to an increase in the cost.

The latter method is promising, however in order to carry out this use should be made of a mixed liquid prepared by mixing the inorganic film composition containing chromates or phosphates as the inorganic components with an aqueous emulsion in which the organic film-forming resin is emulsified and dispersed in water. This has offered the following problems.

First, a problem is a short pot life that the emulsified and dispersed state of the resin become unstable under the influence of the chromate showing a strong oxidative effect and, in several hours after mixing, the mixed liquid gels due to the resin aggregation, and in consequence, the mixed liquid often becomes unable to be used during coating works.

Second, a problem is that the film properties needed for the insulating films on electromagnetic steel plates such as insulating, corrosion resistance and punching properties become incomplete, since a number of film defects such as crateriform pinholes or foams are caused in the films formed by the application and drying of the aforesaid mixed liquid on electromagnetic steel plates.

DISCLOSURE OF SUMMARY OF THE INVENTION

As a result of studies made with a view to providing a method for forming insulating films which solves the aforesaid problems, thereby limiting to the lowest degree foaming at the time of coating works and allowing the obtained films to be thin and possess improved film properties, the present invention has been made by investigating out that the object thereof can be achieved by using as the organic component a combination of acrylic resin and/or acryl-styrene resin with guanamine resin.

That is, the present invention relates to a method for forming an insulating film on electromagnetic steel plates, characterized in that at least one guanamine resin having a particle size of 0.2 to 1 micrometer is added to and mixed with an aqueous emulsion of pH 2 to 8 in which an organic film-forming resin comprising an acrylic resin or an acryl-styrene resin or combination thereof is emulsified and dispersed in such a manner that said guanamine resin amounts to 10 to 90 weight % with respecd to the total amount of the unvolatile matters of the former and the latter to thereby obtain a mixed resin liquid, the thus obtained mixed resin liquid is added to and mixed with an aqueous solution of an inorganic film-forming substance containing a chromate as the main component in such a manner that the unvolatile matters of said mixed resin liquid amounts to 15 to 120 weight parts with respect to 100 weight parts of said chromate calculated as $CrO_3$, and the thus obtained film composition for electromagnetic steel plates is coated on an electromagnetic steel plates and heated at a temperature of 300° to 500° C. to form an insulating film in a range of 0.4 to 2.0 $g/m^2$.

BRIEF DESCRIPTION OF THE DRAWING

The drawing shows the proper range of the proportion of the aqueous emulsion of the organic film-forming resin and benzoguanamine resin that is one type of the guanamine resin with preparing the mixed resin liquid.

DETAILED DISCLOSURE OF THE INVENTION

To better understand the present invention, reference will now be made to various experiments conducted in the course of the accomplishment of the present invention.

The present inventors have first considered it to be of importance for the prolonged pot life of the film compositions that the conventional inorganic film composition composed mainly of a chromate showing a strong oxidative effect and an aqueous emulsion of the organic film-forming resin to be added to and mixed with it are compatible with each other, and a mixed liquid thereof can be kept stably emulsified and dispersed in a state containing a strongly oxidative chromate without decomposing said resin present as the emulsion particles, and have made investigations of the method for the realization thereof.

For the conventional inorganic film compositions containing a chromate as the main component are exemplified by an aqueous solution disclosed in Patent Publication No. 32-9555 (aqueous solution prepared by adding 1 to 4% by weight of glycerin and 2 to 5% by weight of boric acid to a 10 to 60% by weight aqueous solution of zinc dichromate, and the composition of which is expressed in terms of the $CrO_3$—ZnO—$H_3BO_3$—glycerin system), or an aqueous solution in which MgO or CaO having similar chemical properties reacting with free chromic acid is substituted for ZnO in the above-mentioned composition these solutions being usually in a pH range of 5.0 to 5.7. By way of example, there is mentioned an aqueous solution of pH 5.2 which contains $CrO_3$, MgO, $H_3BO_3$ and glycerin in the respective concentrations of 150, 30, 50 and 30 g/l (hereinafter be referred to as Formulation 1).

Compatibility and stability were tested by adding and mixing aqueous emulsions of various organic film-forming resins to and with this conventional inorganic film composition. As a result, it was found that both aqueous emulsions of pH 2 to 8 based on acryl resins [for instance, an aqueous emulsion of pH 2.4 in which polymethyl methacrylate is emulsified and dispersed in a concentration of 150 g/l and the unvolatile matter are contained in a proportion of 30% by weight, (may hereinafter be called Formulation 2)] and the aqueous emulsion of pH 2 to 8 based on acryl-styrene resins [(for instance, an aqueous emulsion of pH 7.8 in which a methyl methancrylate-styrene copolymer is emulsified and dispersed in a concentration of 150 g/l and the unvolatile matters are contained in a proportion of 35% by weight, (may hereinafter be referred to as Formulation 3)] are compatible and stable with respect to the aforesaid inorganic film composition.

With only a mixed liquid of the inorganic film composition containing such a chromate as the main component with the aforesaid aqueous emulsions of the organic film-forming resins, the aforesaid first problem may be solved, but the second problem remains unsolved. Crateriform pinholes and foams are formed in the film applied in-situ and dried, leading to considerable deterioration of film properties such as corrosion resistance, insulating and punching properties.

Investigations that followed revealed the following. In the process for forming the mixed inorganic/organic films, a liquid mixture comprising inorganic and organic components is generally applied and dried on an electromagnetic steel plate with the use of a roll coater and so on. In this case, a desired drying process for the liquid mixture to be carried out at a relatively low temperature over an extended period of time is as follows. That is, as the mixed liquid is dried, the resin particles therein move in close to one another and are packed in the closest or pseudo-closest state with the water content thereof evaporating off and the interstices are filled with water in which surfactants and inorganic salts are disssolved. As drying proceeds further, the resin particles come in contact with one another, and upon the drying temperature being higher than the melting point of the resin particles, the resin particles then deform and are fused together to a continuous film. On the production line, however, drying is carried out within a short time of usually 1 minute or less to improve productivity. To this end, a drying furnace is set at an atmospheric temperature of 300° to 500° C. This atmospheric temperature is much higher than the melting point of general the resin particles. Under such drying conditions in which the resin particles in the mixed liquid are rapidly heated at such a high temperature, as they are rapidly heated to a temperature higher than their melting point within a short time, at which the surface resin particles are initially fused together to initiate the formation of a film, they come into the later stage of the formation of a film before sufficient evaporation of water in the film's interior takes place. It has been found that the water remaining in the interior of the film breaks the film, thus resulting in a number of film defects such as crateriform pinholes or foams etc.

In the course of various investgations made of the aqueous emulsions of various organic film-forming resins as mentioned, on the other hand, the present inventors have found that a guanamine resin having a melting point of 225° C. or higher is very effective in the suppression of occurrence of crateriform pinholes and foaming at the time of the formation of films.

Accordingly, a number of experiments have been conducted, wherein various guanamine resins are added to and mixed with aqueous emulsions of said organic film-forming resins comprising an acrylic resin and/or an acryl-styrene resin to obtain mixed resin liquids, the mixed resin liquids are added to and mixed with said inorganic film compositions to prepare film compositions, and the thus obtained film compositions are applied and dried on electromagnetic steel plates to form films for the purpose of making investigations of the relationships of type, range of effective particle size of the guanamine resin, proportion of the materials at the time of preparing said mixed resin liquids and film compositions and effect upon the suppressing occurrence of crateriform pinholes and foaming as well as stability of said film compositions.

As a result, it has been found that the film compositions containing the guanamine resin maintain stability, and the guanamine resin particles are kept in a substantially particulate state even in the later stage in the drying process after coated on electromagnetic steel plates, so that the water vapor in the film interior dissipate therefrom relatively easily. It has also been found that by the proper selection of the proportion of materials and the particle size of the guanamine resin, the occurrence of crateriform pinholes and foaming is not only reduced to an extremely low level, but various film properties of the obtained films are also strikingly improved. Thus, the present invention has been accomplished.

The structure of the present invention will now be explained.

The acrylic resin used in the present invention refers to a resin capable of forming a stable acrylic resin emulsion in an acidic aqueous solution. For instance, a resin of Toughtic $G_2$ (trade name) manufactured by Nippon Exlan Kogyo K. K. is included in it.

And the acryl-styrene resin refers to a resin capable of forming a stable acryl-styrene resin emulsion in an acidic aqueous solution. For instance, Polytlon F-2000 (trade name) manufactured by Asahi Kasei Kogyo K. K. is mentioned.

By the guanamine resin is meant a resin consisting of a polymer of guanamines (compounds in which one amino group of melamine is substituted by a hydrogen atom, an aliphatic or aromatic hydrocarbon or a derivative of such hydrocarbons) having a melting point of at least 225° C. Specifically, formoguanamine resin (318° C.)—[the figure in parentheses will refer to that of a melting point which hereafter the same]—, acetoguanamine resin (270° C.), benzoguanamine resin (227° C.), phenylacetoguanamine resin (238° C.) and methoxyguanamine resin (252° C.) are mentioned. As will be described later, it has been confirmed that such guanamine resins should preferably have a particle size of 0.2 to 1 μm in view of the dispersibility and stability of the mixed resin and film compositions during preparation.

The proper proportion of either one or both of the acrylic resin and the acryl-styrene resin and the guanamine resin for preparing the mixed resin liquid making use of the aforesaid respective materials was investigated in the following manner.

An aqueous emulsion of the acryl-styrene resin exemplified by Formulation 3 was used as the aqueous emulsion of the organic filmforming resin, and benzoguanamine resin having a melting point of 227° C. and a particle size of 0.2 to 1 μm was used as the guanamine resin. Various mixed resin liquids were prepared in such a manner that the amount in weight % of the latter was varied (from 0 weight % to 100 weight % inclusive) with respect to the total amount of the unvolatile matters of the former and those of the latter.

These mixed resin liquids were added to Formulation 1 exemplified earlier as the inorganic film composition containing a chromate as the main component in such a manner that all the unvolatile matters (corresponding to the total amount of the unvolatile matters of said aqueous emulsion and benzoguanamine resin) of the former amount to 100 weight parts with respect to 100 weight parts of the amount of chromate in the latter calculated as $CrO_3$ (which may hereinafter be simply referred to as the amount of $CrO_3$ calculated), thereby obtaining various film compositions containing varied amounts of benzoguanamine resin used.

The examination was made for the various film properties of the insulating films obtained by coating on electromagnetic steel plates of these film compositions by a roll coater (of the natural and reverse type) followed by drying. Coating was carried out in such a manner that the film amount was kept constant at 1±0.2 g/m² after drying, which was conducted under certain conditions of 400° C. for 1.5 minutes. The drawing illustrates the relationship in terms of the weight % of the amount of the benzoguanamine resin with respect to the total unvolatile matters contained in various mixed resin liquids used for the preparation of various film compositions, the amount of crateriform pinholes occurred in the electromagnetic steel plates, the interlayer resistance (ohms/cm² per plate) and the amount of chromium elution (micrograms/m²) from the films. The procedures for the measurement thereof are the same as those described in the examples to be described later.

From the drawing, it is found that the amount of crateriform pinholes occurred decreases considerably with increases in the content of benzoguanamine resin. If benzoguanamine resin are contained in the total unvolatile matters of the mixed resin liquid in an amount of 5 weight %, the amount of pinholes occurred decreases to half at the time when the benzoguanamine resin is 0 weight %, viz., only the aqueous emulsion of the aforesaid acryl-styrene resin is used (this case may hereinafter be referred to as the blank), and reduces to several % or less at the time when that the benzoguanamine resin is 10% by weight.

And the interlayer resistance that is one of the important film properties is about twice that of the blank, when the benzoguanamine resin is 10% by weight with respect to the total unvolatile matters of the mixed resin liquid used, as will be understood from the drawing. Such a rise in the interlayer resistance roughly corresponds to the decrease in the amount of crateriform pinholes.

Referring further to the results of tests (two-hour immersion in boiling water) of Cr-elution resistance that is one of the film properties, the amount of Cr elution is kept virtually constant in a wide range, when the amount of benzoguanamine resin increases from 0% by weight but a sharp increase in the amount thereof is observed in the vicinity of 90% by weight. In view of the fact that the benzoguanamine resin particles was clearly found by the micro-observation of the surface of the film formed of a mixed resin containing 95 weight % of benzoguanamine resin, this cause, although still unclarified, is considered to be attributable to a lowering of the binder action of the organic film-forming resin due to its quantitative reduction, which acts as the binder to fill in between the guanamine resin particles.

From the aforesaid results, it is concluded that the proper quantity of benzoguanamine resin with respect to the total unvolatile matters of the mixed resin is in a range of 10 to 90 weight %. It was thus confirmed that the incorporation of benzoguanamine resin into the film compositions gave rise to striking improvements in film properties. In consequence of similar experiments conducted with formoguanamine, acetoguanamine, phenylacetoguanamine and methoxyguanamine resins, similar results to the above-described were obtained. Use of the aqueous emulsion of the acrylic resin (said Formulation 2 was used) in place of the aqueous emulsion of the acryl-styrene resin or both aqueous emulsions also gave similar results to the above-described. Further experiments revealed that the aforesaid effect could be attained at a practically sufficient level, if the proportion of benzoguanamine resin to be mixed with the inorganic film compositions containing a chromate as the main component varied within the scope defined by the present invention.

Also, investigations were made of the particle size of the guanamine resin. In a particle size of less than 0.2 micrometers, the guanamine resin is so less effective in the promotion of water vapor dissipation that the occurrence of crateriform pinholes cannot be suppressed on the one hand, and the guanamine resin having a particle size exceeding 1 micrometer is unpreferred on the other, since that particle size may be larger than the thickness of the resulting film, and this causes a drop of the space factor in the core material for motors, for instance.

Next, investigations were made of the relationships between proportion of the inorganic film compositions and mixed resin liquids and thickness or film properties of the obtained films.

Prepared were the mixed resin liquids of the acrylic resin-guanamine resin and acryl/styrene resin-guanamine resin wherein the guanamine resin accounted for 75 weight % of the total unvolatile matters thereof. Either one of these mixed resin liquids was added to and mixed with the inorganic film composition containing a chromate as the main component (said Formulation 1 was used) in such a manner that the total unvolatile matters of the former accounted for varied parts with respect to 100 weight parts of the latter calculated as $CrO_3$, thereby obtaining film compositions. With the obtained film compositions, coating testings for electromagnetic steel plates were carried out by means of roll coating.

In consequence, it was investigated out that when the total unvolatile matters of the mixed resin liquids were 5 to 6 weight parts with respect to 100 weight parts of the inorganic film compositions calculated as $CrO_3$, the pickup properties at the time of roll coating became too unsatisfactory to achieve uniform coating. Thus, the mixed resin liquid should contain a total of at least 10 weight parts, preferably at least 15 weight parts of the unvolatile matters. As regards the punching and corrosion resitance properties of the film properties, preferred results were obtained when the unvolatile matters of the mixed resin liquids amounted to 10 weight parts or more with respect to 100 weight parts of the inorganic film compositions calculated as $CrO_3$. Putting these consequences together, the lower-limit proportion of the mixed resin liquid to be added to and mixed with the inorganic film compositions containing chromate as the main component is placed upon 15 weight parts of the former with respect to 100 weight parts of the latter unvolatile matter calculated as $CrO_3$. (Which may hereinafter be simply referred to as the proportion of the mixed resin liquid.)

The upper-limit proportion of the mixed resin liquids is determined as follows. That is to say, it was found that to give the organic components to be contained in the film compositions in an increased amount is extremely effective for punching and coating properties and that to give too much increased amount of the organic components caused a drop of TIG welding properties which was closely correlated with the properties of the insulating films. As a result of investigations of the limit thereof, the upper-limit proportion of the mixed resin liquids was placed on 120 weight parts.

It is noted that the guanamine resin may be added to the aqueous emulsions of the acrylic resin and/or acryl-styrene resin in the powdery form, or alternatively in the form of aqueous dispersions. Through the aforesaid investigations, it was found that the addition of the guanamine resin did not interfer with the stabilizing properties of the film compositions.

When electromagnetic steel plates were coated with the thus obtained insulating-film compositions, the upper- and lower-limit amounts of the films were determined as follows. The more the amounts of the films, the higher the insulating and corrosion-resistant effects. However, on the other hand, there is a demand for decreases in the amounts of the films in view of space factor (which is preferably to be decreased so as to accommodate well to the minitaturization of equipment) as well as economical and other considerations. As stated earlier, when the content of the guanamine resin in the mixed resin liquids was made to 10 to 90 weight % based on the total unvolative matters thereof, the obtained films showed an interlayer resistance of twice or more than that obtained in the absence of the guanamine resin. Thus, the lower-limit amount of the films was placed at 0.4 g/m² assuring corrosion resistance properties, whereas the upper-limit amount thereof was placed at 2.0 g/m² that was the allowable limit taking TIG welding properties, space factor, economical and other considerations into account.

After the film compositions have been coated on electromagnetic steel plates to the aforesaid film amounts by the roll coating and other processes, heating and drying are carried out to form thereon insulating films. As to drying conditions, drying may be carried out by heating at high temperatures within a short time, since the occurrence of crateriform pinholes or foams can be suppressed by the addition of the guanamine resin, however, usually, it is suitably carried out at 300° to 500° C. for 0.5 to 3 minutes.

EXAMPLES AND COMPARATIVE EXAMPLES INCLUDING THE BEST MODE FOR EMBODYING THE INVENTION

The present invention will now be explained further specifically with reference to the examples and comparative examples.

Respective film compositions were prepared according to the components specified in a table. The respective materials used are as follows. As the aqueous emulsion of the inorganic film-forming substance containing a chromate as the main component, Formulation 1 was used and as the aqueous emulsions of the acrylic resin and acryl-styrene resin, Formulations 2 and 3 were used. As the guanamine resin, the same as used in the experimentation explained earlier with reference to the drawing was used.

In the table, respective symbols in the column "Components of Mixed Resin Liquids" stand for the following materials. That is, [AE] denotes the aqueous emulsion of the acrylic resin, [AS] the aqueous emulsion of the acryl-styrene resin, $[G_1]$ benzoguanamine resin, $[G_2]$ formoguanamine resin, $[G_3]$ acetoguanamine, $[G_4]$ phenylacetoguanamine and $[G_5]$ methoxyguanamine. The figures given in the subcolumns of these symbols are the weight parts of the materials used for the preparation of the mixed resin liquids (for aqueous emulsion, unvolatile matters contained in the amount used).

By using the prepared film compositions, these were reversecoated on electromagnetic steel plates by means of the roll coating process. Thereafter, the coated films were dried at an atmospheric temperature of 400° C. for 1.5 minutes in a hot-air drying type oven to form insulating films. The amounts of the films were regulated by the roll-press conditions, the concentration of the film compositions and the like.

The above-described films obtained as above by coating and drying the prepared film compositions were investigated and evaluated as to their amounts and the occurrence of crateriform pinholes, and estimated for their respective properties such as adhesive, corrosion resistance, chromiun eluting, interlayer resistance, punching and welding properties.

The aforesaid properties were evaluated according to the following procedures.

Occurrence of Crateriform Pinholes

The electromagnetic steel plates having the films formed after drying thereof (hereinafter referred to as test pieces) were observed under an electron microscope, and a photograph of 10,000 magnifications was taken of each test piece. The amount of the pinholes occurred was calculated from the ratio of the crater area to the total area in the photograph, and expressed in terms of %.

Film Amount

Measurements were made by the procedure in which the test pieces were immersed in a 50% aqueous solution of NaOH for the dissolution of the films and the fluorescent X-ray procedure.

Adhesion

The test pieces were wound around a round rod of 5 mm in radius for the observation of the peel off state of the films under a loupe of 10 magnifications.
○ No peeling-off observed.
△ Slight peeling-off observed.
× Remarkable peeling-off observed.

Corrosion Resistance

The corrosion resistance was judged in terms of the degree of red rust occurred on the test pieces after they were sprayed with a saline solution for 7 hours according to JIS Z 2371.
◉ No red rust occurred.
○ Red rust occurred in an area of 5% or less.
△ Red rust occurred in an area of 5 to 10%.
× Red rust occurred in an area of 10% or more.

Chormium Elution

After the test pieces were immersed in boiling water for 2 hours, the Cr in the boiling water was measured by the atomic absorption process.

Interlayer Resistance

Measured according to the method of JIS C 2550.

Punching Properties

The punchability was expressed in terms of the maximum punching times at which the samples showed a backing height of at most 50 μm, when they were punched under the following conditions.
Number of Strokes: 500 strokes/min.
Mold Material: SKD 11
Punched Diameter: 5 mm in Diameter
Punching Oil: Light Oil
Press Machine: High-Speed Automatic Press manufactured by Mitsui Seiki K. K.

Welding Properties

Under the following conditions:
Welding Current: 120 A
Electrode Diameter: 2.4 mm φ
Core Pressure: 100 kg/cm²
Welding Rate: 60 cm/min.
Welding Machine: TIG Welder manufactured by Osaka Henatsuki K. K.
TIG welding was carried. Thereafter, the degree of occurrence of blowholes were evaluated for the estimation of welding properties.
○ No blow-hole found.
△ Slight blow-holes found.
× Remarkable blow-holes found.
The results are set out in the following table.

TABLE

| Nos of Examples and Comparative Examples | Inorganic Film Composition | [AE] | [AS] | $[G_1]$ | $[G_2]$ | $[G_3]$ | $[G_4]$ | $[G_5]$ | Total Amount of Guanamine Resin N.B. 1 (weight %) | Total Unvolatile Matters in Mixed Resin Liquid N.B. 2 (weight %) |
|---|---|---|---|---|---|---|---|---|---|---|
| Examples |  |  |  |  |  |  |  |  |  |  |
| 1 | Formulation 1 | 5 | — | 15 | — | — | — | — | 75 | 100 |
| 2 | " | 5 | — | — | 15 | — | — | — | 75 | 100 |
| 3 | " | 5 | — | — | — | 15 | — | — | 75 | 100 |
| 4 | " | 5 | — | — | — | — | 15 | — | 75 | 100 |
| 5 | " | 5 | — | — | — | — | — | 15 | 75 | 100 |
| 6 | " | 3 | — | 15 | — | — | — | — | 83 | 120 |
| 7 | " | 2 | 1 | 8 | — | — | — | — | 73 | 73 |
| 8 | " | 15 | — | 3 | — | — | — | — | 17 | 120 |
| 9 | " | 2 | — | 15 | — | — | — | — | 88 | 115 |
| 10 | " | — | 4 | 10 | — | — | — | — | 71 | 93 |
| 11 | " | 1 | 1 | 10 | — | — | — | — | 83 | 80 |
| 12 | " | 1 | 1 | 1 | — | — | — | — | 33 | 15 |
| 13 | " | 3 | — | 8 | 7 | — | — | — | 83 | 75 |
| 14 | " | 3 | — | 5 | 2 | 3 | 5 | — | 83 | 75 |
| Comparative Examples |  |  |  |  |  |  |  |  |  |  |
| 1 | " | — | — | 15 | — | — | — | — | 100 | 75 |
| 2 | " | 10 | — | 0.5 | — | — | — | — | 5 | 75 |
| 3 | " | 5 | — | 15 | — | — | — | — | 75 | 135 |
| 4 | " | 10 | 5 | — | — | — | — | — | 0 | 100 |
| 5 | " | 1 | — | 1 | — | — | — | — | 50 | 14 |

| Nos of Examples and Comparative Examples | Amount of Film | Amount of Crateriform Pinholes (%) | Adhesive Property | Corrosion Resistant Property | Chromium Eluting Property (μg/m²) | Interlayer Resisting (Ω·cm²/plate) | Punching Property (× 10⁴ times) | Welding Property |
|---|---|---|---|---|---|---|---|---|
| Examples |  |  |  |  |  |  |  |  |
| 1 | 0.96 | Less than 1 | ○ | ○ | Less than 200 | 65 | 150~200 | ○ |
| 2 | 0.95 | Less than 1 | ○ | ○ | Less than 200 | 64 | 150~200 | ○ |
| 3 | 0.95 | Less than 1 | ○ | ○ | Less than 200 | 65 | 150~200 | ○ |
| 4 | 0.94 | Less than 1 | ○ | ○ | Less than 200 | 65 | 150~200 | ○ |
| 5 | 0.97 | Less than 1 | ○ | ○ | Less than 200 | 63 | 150~200 | ○ |
| 6 | 0.47 | Less than 1 | ○ | ◉ | Less than 200 | 52 | 150~200 | ○ |
| 7 | 0.63 | Less than 1 | ○ | ○ | Less than 200 | 68 | 100~150 | ○ |
| 8 | 1.00 | 3 | ○ | ◉ | Less than 200 | 70 | >200 | △ |
| 9 | 1.80 | Less than 1 | ○ | ◉ | Less than 200 | 75 | >200 | △ |
| 10 | 0.95 | Less than 1 | ○ | ○ | Less than 200 | 60 | 150~200 | ○ |
| 11 | 1.02 | Less than 1 | ○ | ○ | Less than 200 | 65 | 150~200 | ○ |
| 12 | 0.96 | 2 | ○ | ○ | Less than 200 | 40 | 50~100 | ○ |
| 13 | 0.85 | Less than 1 | ○ | ○ | Less than 200 | 63 | 150~200 | ○ |

TABLE-continued

| | | | | | | | | |
|---|---|---|---|---|---|---|---|---|
| 14 | 0.90 | Less than 1 | O | O | Less than 200 | 66 | 150~200 | O |
| Comparative Examples | | | | | | | | |
| 1 | 0.80 | Less than 1 | Δ~X | Δ | 1300 | 75 | 150~200 | O |
| 2 | 0.95 | 15 | Δ | X | Less than 200 | 35 | 150~200 | O |
| 3 | 1.05 | Less than 1 | O | O | Less than 200 | 70 | >200 | X |
| 4 | 0.95 | 25 | O | X | Less than 200 | 30 | 150~200 | Δ~X |
| 5 | 0.98 | Less than 1 | O | X | Less than 200 | 65 | <80 | O |

N.B. 1: The weight % of guanamine with respect to the total unvolatile matters in the mixed resin liquid.
N.B. 2: The number of weight parts with respect to 100 weight parts calculated as $CrO_3$.

From the table, it is noted that according to the method of the present invention, the occurrence of crateriform pinholes can be suppressed by the incorporation of a certain or higher amount of the guanamine resin into the the film compositions, and the properties of the insulating films obtained on electromagnetic steel plates are well satisfactory for the insulating film of the electromagnetic steel plate which has been achieved.

Examples 1-5 are for comparison of properties of the insulating films in which one guanamine resin is contained respectively, in which all show excellent properties. It is also noted that the insulating films of Examples 13 and 14, in which two or more guanamine resins are contained, show properties similar to that of the one guanamine resin-containing films. In particular, the Example 6 showed an interlayer resistance of 50 ohm·cm$^2$/plate or higher and a punching of 1,500,000 times, although its film amount was small. Referring to Examples 8 and 9, the insulating films contain an increased amount of the organic components and are formed in an increased amount of coating, but particularly excel in punching, as expressed in terms of 2,00,000 times. In this case of these examples the insulating films are slightly poor in welding properties, but offer no practical problems.

On the other hand, the film composition of Comparative Example 1 substantially contains the guanamine resin (benzoguanamine was used) alone as the organic component, and cannot be used, since problems arise in connection with adhesive, corrosion resistance and chromium eluting properties. Referring to Comparative Example 2 wherein the mixed resin liquid used as the organic component contains the guanamine resin, but the weight % thereof with respect to the total unvolatile matters of the mixed resin liquid is lower than the lower-limit defined in the present invention, and Comparative Example 4 in which no guanamine resin is contained at all, the insulating films have a number of crateriform pinholes and are strikingly poor in corrosion resistance and interlayer resistance properties, so that they cannot be used. Referring to Comparative Example 3 in which while the composition of the mixed resin liquid comes under the scope defined in the present invention, the proportion of the total unvolatile matters of the mixed resin liquid with respect to the amount of $CrO_3$ calculated is higher than the upper limit defined in the present invention, a problem arises in connection with welding properties. In Comparative Example 5, on the contrary, problems arise in connection with punching properties as well as corrosion resistance properties, since that proportion is lower.

From the aforesaid examples and comparative examples, it is noted that according to the present invention, any film defects such as crateriform pinholes and foams are not found in the obtained films, and the many properties needed for the insulating films on electromagnetic steel plates are well satisfied.

Industrial Applicability

As explained in the foregoing, the present invention provides a method for forming insulating films on electromagnetic steel plates by coating and drying thereon an insulating film composition obtained by adding to and mixing with the inorganic film composition containing a chromate as the main component the mixed resin liquid of an aqueous emulsion of the acrylic resin and/or acryl-styrene resin with the guanamine resin, and commercially available materials can be used for the most part of the raw materials. And according to the present invention, the occurrence of film defects such as crateriform pinholes and foams can be prevented at the time of drying. It is thus possible to form the insulating films excelling in film properties such as interlayer resistance, corrosion resistance, adhesive, punching and welding properties.

We claim:

1. A method for forming an insulating film on an electromagnetic steel plate, comprising the steps of:

providing an aqueous emulsion having at least one organic film-forming resin selected from the group consisting of acrylic resins and acryl-styrene resins emulsified and dispersed therein, said aqueous emulsion having a pH of 2 to 8;

adding at least one guanamine resin having a particle size of 0.2 to 1 micron to said aqueous emulsion to form a mixed resin liquid, said guanamine resin comprising 10 to 90% by weight of the total unvolatile matter of said mixed resin liquid;

mixing said mixed resin liquid with an aqueous solution of an inorganic film-forming substance containing chromate as the major component thereof to form a film composition, said film composition comprising 15 to 200 parts by weight of the unvolatile matter of the mixed resin liquid to 100 parts by weight of chromate calculated as $CrO_3$;

coating an electromagnetic plate with said film composition; and then heating the coated electromagnetic plate at a temperature of 300° to 500° C. to form an insulating film of 0.4 to 2.0 g/m$^2$.

* * * * *